United States Patent [19]

Isobe et al.

[11] Patent Number: 5,056,330
[45] Date of Patent: Oct. 15, 1991

[54] REFRIGERATING SYSTEM FOR USE IN VEHICLE WITH ENGINE WHICH ENABLES SELECTIVE USE OF COMMERCIAL AC POWER AND A GENERATOR DRIVEN BY THE ENGINE FOR DRIVING THE REFRIGERANT COMPRESSOR

[75] Inventors: Toshimi Isobe, Isesaki; Riichi Sakano, Saitama, both of Japan

[73] Assignee: Sanden Corporation, Japan

[21] Appl. No.: 524,988

[22] Filed: May 18, 1990

[30] Foreign Application Priority Data

May 19, 1989 [JP] Japan .................................. 1-124517

[51] Int. Cl.⁵ ............................................. F25B 27/00
[52] U.S. Cl. ........................................ 62/236; 62/134; 62/228.4; 62/323.3
[58] Field of Search .................. 62/243, 236, 133, 134, 62/323.3, 228.4, 228.5, 239, 323.4, 157, 231; 236/46 F

[56] References Cited

U.S. PATENT DOCUMENTS

| | | | |
|---|---|---|---|
| 2,964,923 | 12/1960 | Cone | 62/236 X |
| 4,498,311 | 2/1985 | Sakano et al. | 62/227 |
| 4,667,480 | 5/1987 | Bessler | 62/228.4 |
| 4,831,837 | 5/1989 | Negishi et al. | 62/239 |
| 4,934,158 | 6/1990 | Sakano | 62/239 |

Primary Examiner—Harry B. Tanner
Attorney, Agent, or Firm—Banner, Birch, McKie & Beckett

[57] ABSTRACT

A cooling system including a refrigerant compressor for use in a vehicle for cooling a refrigerated compartment includes a hermetic type compressor containing a DC brushless motor as a compressor driver. An electric generator is actuated by the engine of the vehicle to generate AC electric power which is, in turn, rectified by a rectifier to produce DC electric power for driving the DC brushless motor. A switch is provided to switch over from the electric generator to a commercial AC electric power source. The commercial AC electric power is rectified by the rectifier to supply DC electric power. Thus, the compressor can be driven by a commercial AC electric power source when the engine is stopped. In order to achieve accurate temperature control in the refrigerated compartment when the engine is running, the amount of AC electric power generated by the electric generator is controlled. Further, when the engine is stopped, the amount of rectified commercial electric power delivered to the DC electric motor is controlled.

24 Claims, 5 Drawing Sheets

REFRIGERATING SYSTEM FOR USE IN VEHICLE WITH ENGINE WHICH ENABLES SELECTIVE USE OF COMMERCIAL AC POWER AND A GENERATOR DRIVEN BY THE ENGINE FOR DRIVING THE REFRIGERANT COMPRESSOR

BACKGROUND OF THE INVENTION

1. Field of the Invention

The present invention relates to a refrigerating system and, in particular, to a compressor driving system for use in a vehicle with an engine, such as a refrigerated van or truck.

2. Description of the Prior Art

In order to maintain food, drinks, and other perishables at a proper temperature during transportation, a refrigerating system is often provided in a vehicle such as a van or truck. These vehicles are known in the market as refrigerated vans or chill cars.

FIG. 1 shows a schematic block diagram of a refrigerating system typical of the prior art systems. The refrigerating system 100 includes refrigerant circuit 200 comprising first compressor 201 for compressing refrigerant, condenser 202, receiver-drier 203, expansion valve 204, evaporator 205 for cooling a refrigerated compartment (not shown) and pipe members 206 for connecting the outlet of each of the elements of the refrigerant circuit to the inlet of each adjacent elements of the refrigerant circuit. First compressor 201 is provided with electromagnetic clutch 211 for intermittently receiving the driving force from vehicle engine 101 through belt 102. The intermittent operation of the electromagnetic clutch 211 serves to intermittently couple the engine to the compressor. Thus, first compressor 201 is intermittently driven by engine 101 through electromagnetic clutch 211.

Refrigerating system 100 further comprises a standby unit 110 including second compressor 111 and three-phase motor 112 for driving second compressor 111 through belt 113. Outlet port 111a of second compressor 111 is connected to the pipe member between first compressor 201 and condenser 202 through pipe member 206. Inlet port 111b of second compressor 111 is connected to the pipe member between evaporator 205 and first compressor 201 through pipe member 206. Three-phase motor 112 may be directly connected to a commercial AC power source 114 through power source box 115. Power source box 115 also functions as both a rectifier and transformer in order to supply electric power to other electric equipment incorporated in the refrigerant circuit. This equipment may include, for example, an evaporator fan motor (not shown).

Second compressor 111 is provided with electromagnetic clutch 116 for intermittently receiving the driving force from motor 112 through belt 113 by virture of the intermittent operation of electromagnetic clutch 116. Thus, second compressor 111 is intermittently driven by motor 112 through electromagnetic clutch 116.

The temperature of the refrigerated compartment is dependent on the operation of compressor 201 or 111. Therefore, temperature control in the refrigerated compartment is achieved by intermittent operation of electromagnetic clutch 211 or 116, which operate compressors 201 and 111, respectively.

When the vehicle engine is operating, first compressor 201 is driven by the vehicle engine to circulate the refrigerant through refrigerant circuit 200. On the other hand, when the vehicle engine is stopped, such as when the driver is sleeping through the night, second compressor 111 is driven by motor 112. Compressor 201 does not operate since its power source, the engine, is stopped.

In the prior art, the additional provision of second compressor 111 of standby unit 110 complicates piping of the refrigerant circuit.

Furthermore, it is difficult to carry out accurate temperature control in the refrigerated compartment because the refrigerant compressor is driven by the engine which often varies in rotational speed as the vehicle is driven.

To eliminate these drawbacks, another refrigerating system has been proposed. The refrigerating system comprises a refrigerant circuit including a compressor having a three-phase motor and a compressing mechanism driven by the three-phase motor. The motor and compressing mechanism are hermetically contained in one casing. In this refrigerating system, when the vehicle engine is running, the motor of the compressor is connected to a generator driven by the vehicle engine. The generator provides the necessary power to the motor. On the other hand, when the vehicle engine is stopped, the motor driving the compressor is connected to a commercial AC electric power source instead of the vehicle generator. Thus, the motor receives its power from a commercial AC power source. The motor, as it receives power, drives the compressor of the refrigerating system providing the needed cooling.

The temperature in the refrigerated compartment is controlled by switching on and off the generator or by intermittently connecting the commercial AC electric power source to the motor. That is, temperature in the refrigerated compartment is controlled by the intermittent operation of the motor, the rotational speed of which is maintained at a certain value.

However, since the temperature in the refrigerated compartment is controlled by the intermittent operation of the motor, it is still difficult to carry out accurate temperature control in the refrigerated compartment.

SUMMARY OF THE INVENTION

It is an object of the present invention to provide accurate temperature control in a refrigerated compartment. It is another object of the present invention to reduce the fuel consumption of a vehicle engine when the engine drives a generator, which provides electric power for a motor, which drives a compressor for a refrigerating system.

In order to obtain these objects, the present invention provides a system for driving a refrigerant compressor in a refrigerating system for use in a vehicle having an engine, which comprises:

an electric generator mounted on the vehicle and driven by the engine of the vehicle for generating AC electric power, the electric generator including a field coil which receives a direct current;

a selecting device having a first input port coupled to the electric generator for receiving AC electric power generated by the electric generator, a second input port which may be coupled to a commercial AC electric power source, and an output port, the selecting device selecting the input to one of the input ports and supplying the selected input to the output port as the selected AC electric power, the selecting device further providing a power select signal indicating whether the selected AC electric power is the AC electric power provided by the electric generator or the AC electric power provided by a commercial AC electric source;

a rectifying device coupled to the output of the selecting device for rectifying the selected AC electric power to produce DC electric power;

a DC electric motor to be driven by the DC electric power produced by said rectifying device, said DC electric motor being mechanically coupled to the refrigerant compressor;

a sensing device for sensing the temperature of a refrigerated compartment mounted on said vehicle, the sensing device producing a sensed temperature signal which represents the sensed temperature of the refrigerated compartment;

a setting device for setting the temperature of the refrigerated compartment, the setting device producing a set temperature signal which represents the temperature to which the refrigerated compartment is to be set;

a calculating device coupled to the sensing device, the setting device and the selecting device so as to receive the sensed temperature signal, the set temperature signal and the power select signal, the calculating device calculating the difference between the temperature of the refrigerated compartment and the temperature to which the refrigerated compartment is to be set, and producing a difference signal therefrom, the calculating device further coupled to the DC motor so as to receive a rotational speed signal representing the rotational speed of the DC motor so that the calculating device produces the difference signal in consideration of the rotational speed signal;

a current control device coupled to the calculating device for receiving the power select signal and the difference signal, the current control device further coupled to the electric generator so as to control the amount of current supplied to the field coil in response to changes in the difference signal;

a duty ratio control device coupled to the calculating device for receiving the power select signal and the difference signal, the duty ratio control device including a pulsating device for producing a pulse signal as a duty ratio signal, the value of the duty ratio signal being varied in response to changes in the difference signal when the power select signal is of a value representing that the AC electric power of the commercial power source is being delivered to the output port, the value of the duty ratio signal being maintained at a value representing a 100% duty ratio when the power select signal is of a value representing that the AC electric power of the electric generator is being delivered to the output port; and a delivering device coupled to the duty ratio control device for receiving the duty ratio signal, the delivering device intermittently delivering DC electric power to said DC motor in response to changes in the value of the duty ratio signal, the delivering device being coupled to the current control device, the delivering device producing a voltage signal representing the voltage of the DC electric power, the voltage signal being supplied to the current control device so that the current control device controls the amount of current supplied to the motor in response to changes in the difference signal in consideration of the voltage signal.

DETAILED DESCRIPTION OF THE PREFERRED EMBODIMENT

Figure 1:
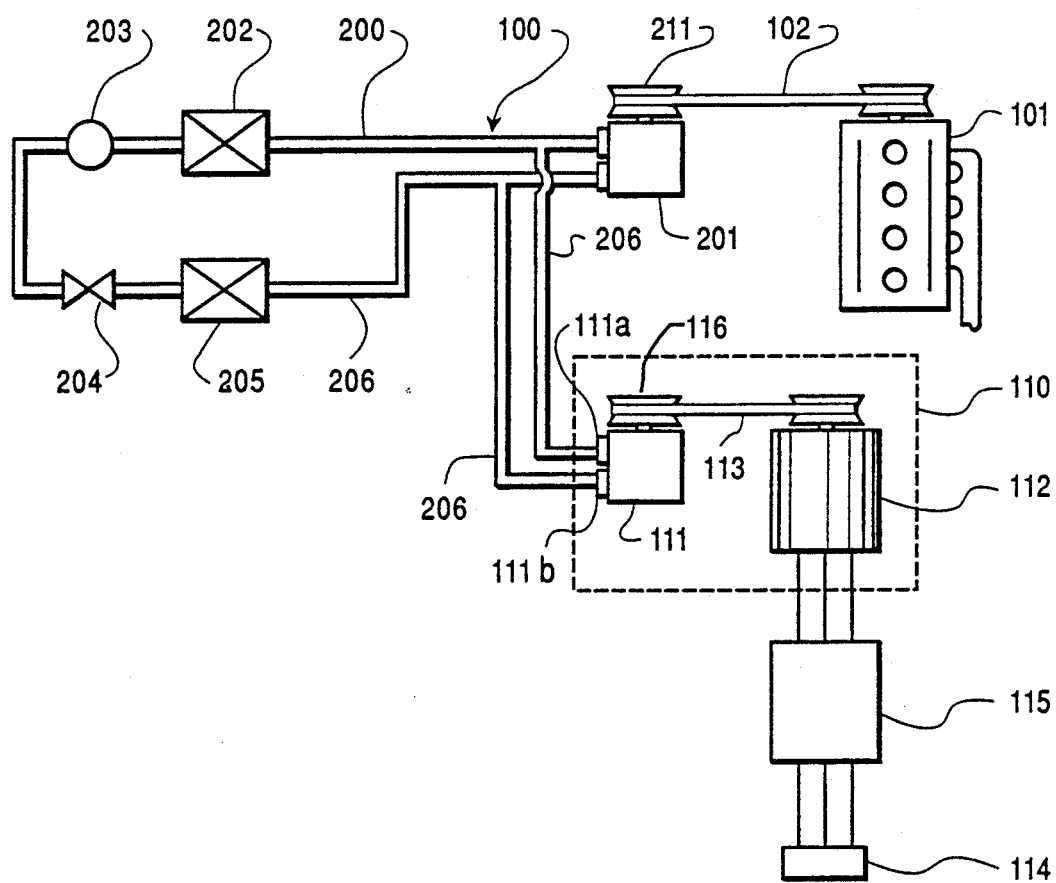
FIG. 1 is schematic diagram of a refrigerating system in accordance with the prior art.
Figure 2:
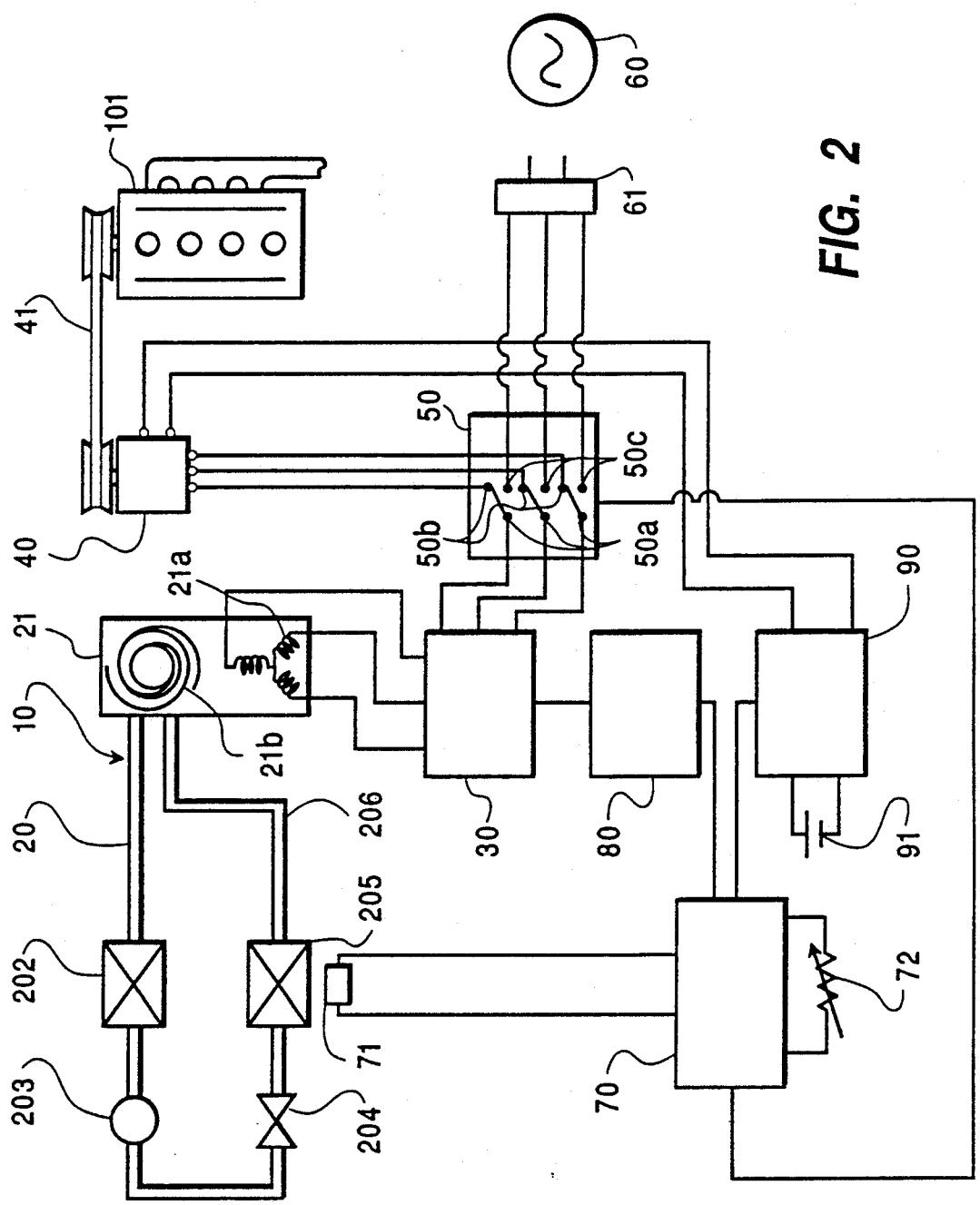
FIG. 2 is a schematic diagram of a refrigerating system in accordance with the present invention.
Figure 3:
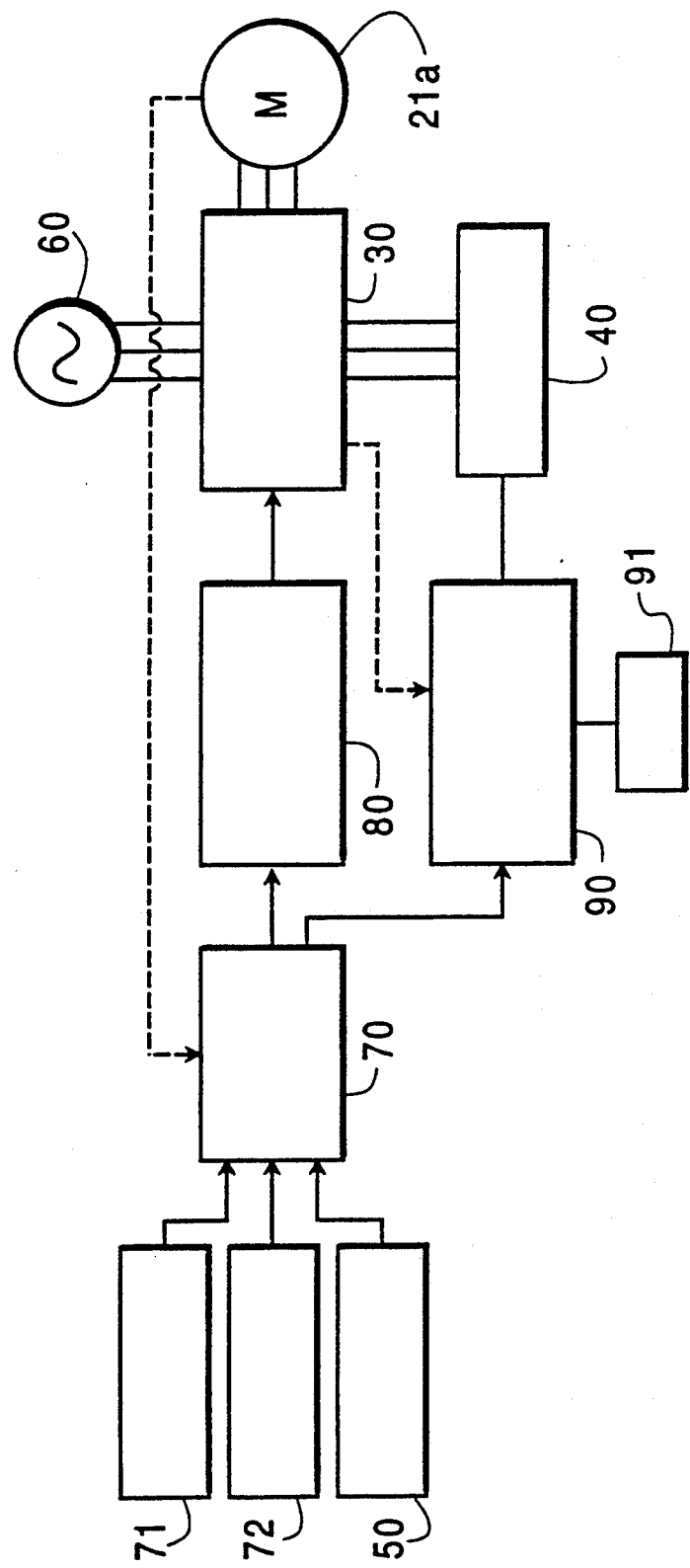
FIG. 3 is a block diagram of a control system for controlling the rotational speed of a DC brushless motor used in the refrigerant compressor of the refrigerating system.

FIG. 2 shows a schematic diagram of a refrigerating system in accordance with the present invention. In the drawing, the same numerals are used to denote corresponding element in FIG. 1 so that substantial explanation thereof is omitted.

With reference to FIG. 2, the refrigerating system 10 includes refrigerant circuit 20 comprising compressor 21, condenser 202, receiver-drier 203, expansion valve 204, evaporator 205 and pipe member 206. Compressor 21 includes a DC brushless motor 21a and scroll type compressing mechanism 21b driven by motor 21a. Motor 21a and compressing mechanism 21b are hermetically contained in one casing (not shown). DC brushless motor 21a is connected to circuit 30 which included a rectifying device (not shown). Circuit 30 is further connected to terminals 50a of electromagnetic changeover switch 50 which includes an electromagnetic device (not shown). Generator 40 is mounted in the vehicle engine compartment, and is driven by vehicle engine 101 through belt 41. Generator 40 is connected to terminals 50b of switch 50. Plug 61 is connected to terminals 50c of switch 50. When the vehicle engine is stopped, plug 61 is inserted into a commercial AC power source 60. The electromagnetic device in switch 50 is thus energized resulting in the connection of terminals 50a to 50c. Consequently, commercial AC electric power is supplied to circuit 30. On the other hand, when the vehicle engine is operating, plug 61 is detached from commercial AC power source 60. Thus, the electromagnetic device in switch 50 is de-energized resulting in the connection of terminals 50a to 50b. Simultaneously, terminals 50a disconnect from terminals 50c. This results in the AC electric power generated at generator 40 being supplied to circuit 30.

By using this technique, the AC electric power generated at generator 40 and the commercial AC electric power are selectively supplied to circuit 30 in response to the connection and disconnection of plug 61 to commercial AC power source 60. Circuit 30 then rectifies the AC power supplied to it. The rectified electric power at circuit 30 is intermittently supplied to DC brushless motor 21a of compressor 21. The duration and frequency of intermission of electric power is controlled by a later mentioned duty ratio signal.

Thermo-sensor 71 is disposed in the refrigerated compartment (not shown) and senses the temperature in the refrigerated compartment. Thermo-sensor 71 is connected to arithmetic or processing circuit 70 and sends a sensed temperature signal representing the temperature in the refrigerated compartment to arithmetic or processing circuit 70. Device 72 is provided for setting the temperature in the refrigerated compartment. Device 72 is also connected to the arithmetic or processing circuit 70 and sends a set temperature signal to arithmetic circuit 70. The set temperature signal represents the temperature to which the refrigerated compartment is to be set, that temperature being referred to hereafter as the set temperature. Arithmetic or processing circuit 70 is also connected to electromagnetic changeover switch 50 and receives a power select signal from switch 50. The power select signal represents the state of the electromagnetic device of switch 50 (i.e. energized or not energized), and thus represents whether the supplied AC electric power is being provided by the vehicle generator or the commercial power supply. Duty ratio control circuit 80 is connected to circuit 30 and sends a later mentioned duty ratio signal to circuit 30. Current control circuit 90 is connected to a field coil (not shown) of generator 40, and further connected to DC power source 91, such as a battery. Current control circuit 90 supplies various current levels of DC electric power to the field coil of generator 40.

Arithmetic or processing circuit 70 receives the sensed temperature signal, the set temperature signal, and the power select signal from the thermo-sensor 71, temperature setting means 72 and electromagnetic changeover switch 50, respectively. When arithmetic or processing circuit 70 receives these three signals, the sensed temperature signal and the set temperature signal are compared so as to calculate a difference signal representing the difference between the sensed temperature and the set temperature. Then, the power select signal and the difference signal are sent to both the current control circuit 90 and the duty ratio control circuit 80. Duty ratio control circuit 80 includes a pulsating device which generates a pulse as a duty ratio signal.

When duty ratio control circuit 80 receives the power select signal, and it is of a value representing that the electromagnetic device of changeover switch 50 is not energized, duty ratio control circuit 80 generates a pulse as the duty ratio signal which represents that the duty ratio is to be maintained at 100%. The duty ratio signal is then sent to circuit 30. When circuit 30 receives the duty ratio signal representing a duty ratio of 100% from duty ratio control circuit 80, the rectified electric power supplied through circuit 30 from generator 40 is continuously applied to DC brushless motor 21a.

Figure 4:
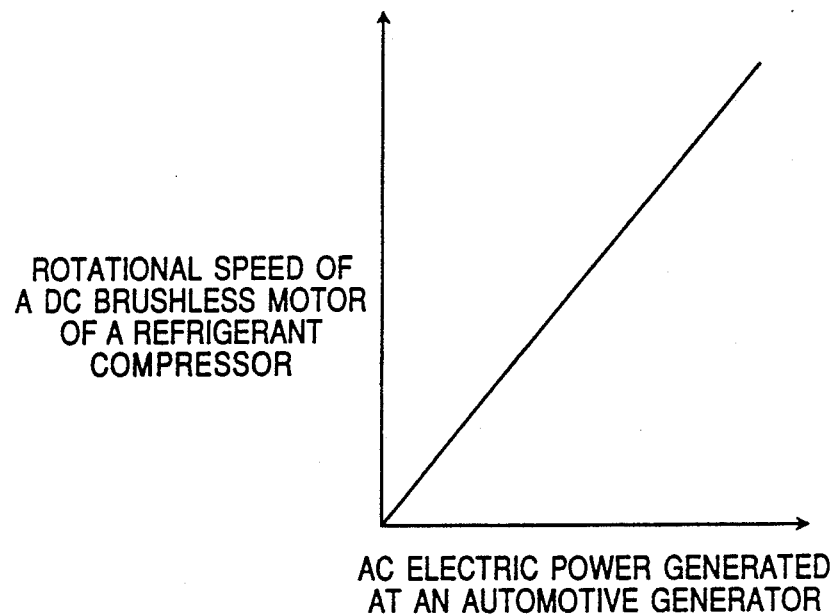
FIG. 4 is a graph showing the relationship between the electric power generated at the vehicle generator and the rotational speed of the DC brushless motor of the refrigerant compressor.

At the same time, current control circuit 90 controls the current level of the DC electric power which is supplied from DC power source 91 to the field coil of generator 40 in response to changes in the difference signal. Generator 40 varies its power output in response to changes in the current of the DC electric power supplied from DC power source 91. Thus, generator 40 varies its electric power output in response to changes in the difference signal. The output of the generator, as controlled by current control circuit 90, is supplied to circuit 30 to become the rectified electric power. The rotational speed of DC brushless motor 21a of compressor 21 is proportional to the value of the AC electric power generated at generator 40 as shown in FIG. 4. Thus, the rotational speed of the DC brushless motor 21a is dependent on the value of the difference signal.

During the period when the DC brushless motor 21a of compressor 21 is driven, a rotational speed signal representing the rotational speed of motor 21a is fed back from motor 21a to arithmetic circuit 70 through a wire (not shown in FIG. 2). Accordingly, arithmetic or processing circuit 70 calculates the difference signal in consideration of the rotational speed signal. Further, a voltage signal representing the voltage of the rectified electric power is fed back from circuit 30 to current control circuit 90 through a wire (not shown in FIG. 2). Accordingly, current control circuit 90 controls the current of the DC electric power which is supplied from DC power source 91 to the field coil of generator 40 in response to changes in the difference signal and in consideration of the voltage signal.

Figure 5:
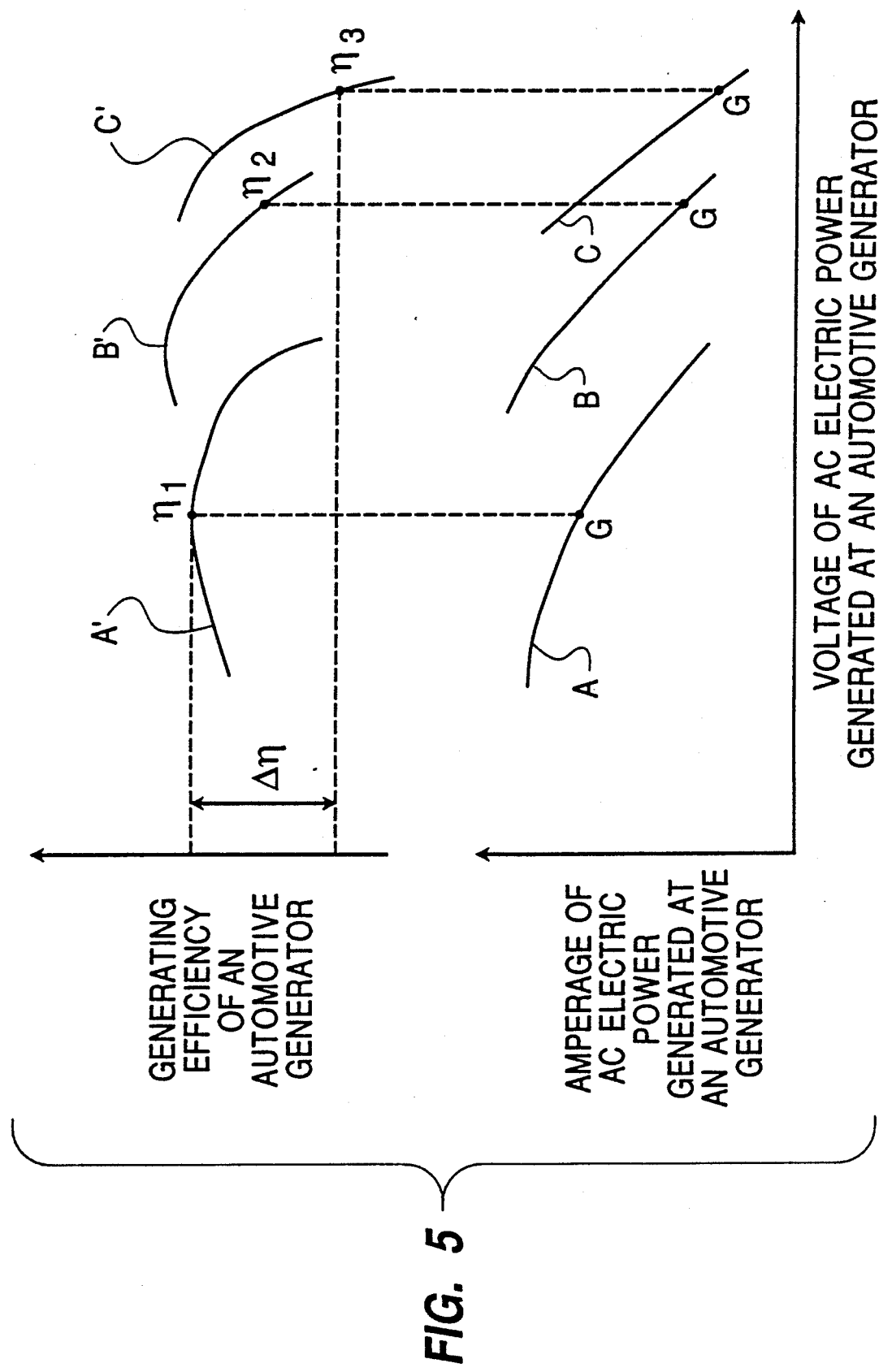
FIG. 5 is a graph showing the voltage-current characteristic of the AC electric power generated at the vehicle generator and the generation efficiency of the vehicle generator when the rotational speed of the vehicle generator is maintained at a certain value.

FIG. 5 is a graph showing the voltage-current characteristic of the AC electric power generated at vehicle generator 40 and also shows the generation efficiency of vehicle generator 40 when the rotational speed of generator 40 is maintained at a certain value. In the graph, curves A, B, and C show the voltage-current characteristic of the AC electric power generated at generator 40 for each of three predetermined currents of DC electric power supplied by DC power source 91 to the field coil of generator 40. Furthermore, curves A', B' and C' show the generating efficiency of generator 40 for each of the above-mentioned three current levels. The current level which generates curves C and C' is greater than the current level which generates curves B and B', which is greater than the current level which generates curves A and A'.

With reference to FIG. 5, when the generator 40 is generating power at power level G in each of the above mentioned three current levels, the generating efficiency of generator 40 varies from $\eta_1$ to $\eta_2$ to $\eta_3$, respectively. Specifically, the generating efficiency of generator 40 corresponding to power G of curve A is greater than the efficiency of generator 40 corresponding to power G of curve C by $\Delta\eta$, that is, by $(\eta_1 - \eta_3)$. Accordingly, vehicle generator 40 can always generate the AC electric power with the best generating efficiency by selectively varying the current of the DC electric power supplied from DC power source 91 to the field coil of generator 40. Therefore, current control circuit 90 is designed to be able to control the current of the DC electric power which is supplied from DC power source 91 to the field coil of generator 40 so that generator 40 always generates AC electric power with the highest generating efficiency during operation of generator 40. Thus, the fuel consumption of the vehicle engine is effectively reduced when brushless motor 21a of compressor 21 is driven by receiving the rectified electric power through circuit 30 from vehicle generator 40.

Figure 6:
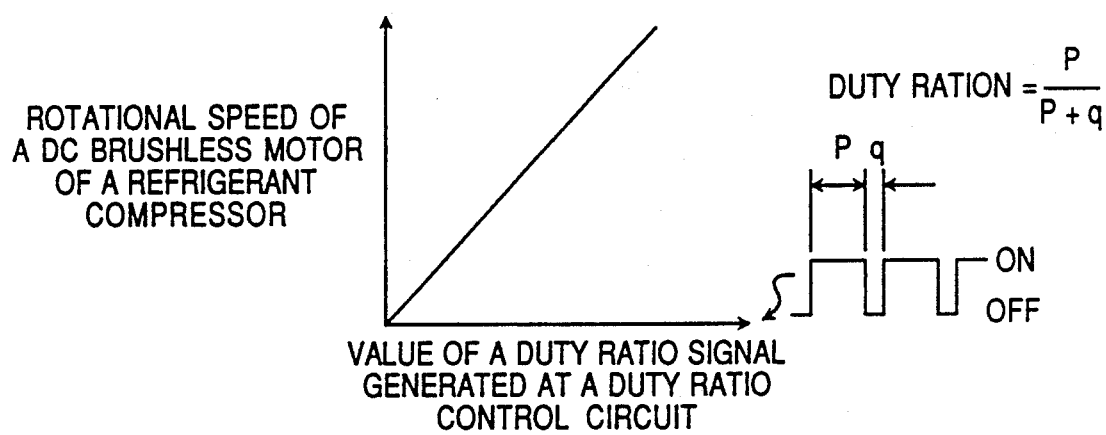
FIG. 6 is a graph showing the relationship between the duty ratio signal and the rotational speed of the DC brushless motor of the refrigerant compressor.

When plug 61 is inserted in commerical AC power source 60, the electromagnetic device of electromagnetic changeover switch 50 is energized so as to supply the commercial AC electric power to circuit 30. The duty ratio control circuit 80 receives from circuit 30 the power select signal which then has a value that represents that the electromagnetic device is energized. Simultaneously, duty ratio control circuit 80 also receives the difference signal from arithmetic circuit 70. When duty ratio control circuit 80 receives the power select signal representing that the electromagnetic device is energized, duty ratio control circuit 80 produces a duty ratio signal. The value of the duty ratio signal changes in response to changes in the difference signal. The duty ratio control circuit send the duty ratio signal to circuit 30. When circuit 30 receives the duty ratio signal, the rectified electric power is intermittently supplied to DC brushless motor 21a from circuit 30 in response to changes in the value of the duty ratio signal. Therefore, the rotational speed of DC brushless motor 21a varies in response to changes in the value of the duty ratio signals shown in FIG. 6.

Thus, both when the vehicle engine is stopped and when the vehicle engine is running, output of the compressor 21 is varied in response to changes in the rotational speed of DC brushless motor 21a of compressor 21. Therefore, the temperature in the refrigerated compartment is controlled by varying the rotational speed of DC brushless motor 21a of compressor 21 so that accurate temperature control in the refrigerated compartment can be achieved.

This invention has been described in detail in connection with the preferred embodiments. These embodiments, however, are merely for example only and the invention is not restricted thereto. It will be easily understood by those skilled in the art that variations and modifications can be easily made within the scope of the invention, as defined by the appended claims.

We claim:

1. A system for driving a refrigerant compressor in a refrigerating system for use in a vehicle having an engine, which comprises:
    an electric generator mounted on the vehicle and driven by the engine of the vehicle for generating AC electric power, the electric generator including a field coil which receives a direct current;
    selecting means having a first input port coupled to the electric generator for receiving AC electric power generated by the electric generator, a second input port which may be coupled to a commercial AC electric power source, and an output port, the selecting means selecting the input to one of the input ports and supplying the selected input to the output port as the selected AC electric power, said selecting means further providing a power select signal indicating whether the selected AC electric power is the AC electric power provided by the electric generator or the AC electric power provided by a commercial AC electric power source;
    rectifying means coupled to the output port of the selecting means for rectifying the selected AC electric power to produce DC electric power;
    a DC electric motor to be driven by the DC electric power produced by said rectifying means, said DC electric motor being mechanically coupled to the refrigerant compressor;
    sensing means for sensing the temperature of a refrigerated compartment mounted on said vehicle, said sensing means producing a sensed temperature signal which represents the sensed temperature of the refrigerated compartment;
    setting means for setting the temperature of the refrigerated compartment, said setting means producing a set temperature signal which represents the temperature to which the refrigerated compartment is to be set;
    processing means coupled to said sensing means, said setting means and said selecting mean so as to receive the sensed temperature signal, the set temperature signal and the power select signal, said processing means calculating the difference between the temperature of the refrigerated compartment and the temperature to which the refrigerated compartment is to be set, and producing a difference signal therefrom; and
    current control means coupled to said processing means for receiving the power select signal and the difference signal, said current control means further coupled to the field coil of the electric generator so as to control the amount of current supplied to the field coil of the electric generator in response to changes in the difference signal.

2. A system for driving a refrigerant compressor according to claim 1 wherein said selecting means comprises a changeover switch.

3. A system for driving a refrigerant compressor according to claim 2 wherein said changeover switch comprises an electromagnetic device.

4. A system for driving a refrigerant compressor according to claim 3 wherein said selecting means senses the state of said electromagnetic device in order to produce the power select signal.

5. A system for driving a refrigerant compressor according to claim 1 wherein said current control means comprises a DC power source.

6. A system for driving a refrigerant compressor according to claim 5 wherein said DC power source comprises a battery.

7. A system for driving a refrigerant compressor according to claim 1 wherein said current control means supplies current to the field coil of the electric generator so as to maximize the efficiency of the generator.

8. A system for driving a refrigerant compressor according to claim 1 wherein said DC electric motor and said compressor are hermetically contained in one casing.

9. A system for driving a refrigerant compressor according to claim 1 wherein said DC electric motor is a brushless motor.

10. A system for driving a refrigerant compressor according to claim 1 wherein said compressor is a scroll type compressor.

11. A system for driving a refrigerant compressor in a refrigerating system for use in a vehicle having an engine, which comprises:
    an electric generator mounted on the vehicle and driven by the engine of the vehicle for generating AC electric power, the electric generator including a field coil which receives a direct current;
    selecting means having a first input port coupled to the electric generator for receiving AC electric power generated by the electric generator, a second input port which may be coupled to a commercial AC electric power source, and an output port, the selecting means selecting the input to one of the input ports and supplying the selected input to the output port as the selected AC electric power, said selecting means further providing a power select signal indicating whether the selected AC electric power is the AC electric power provided by the electric generator or the AC electric power provided by a commercial AC electric power source;
    rectifying means coupled to the output port of the selecting means for rectifying the selected AC electric power to produce DC electric power;
    a DC electric motor to be driven by the DC electric power produced by said rectifying means, said DC electric motor being mechanically coupled to the refrigerant compressor;

sensing means for sensing the temperature of a refrigerated compartment mounted on said vehicle, said sensing means producing a sensed temperature signal which represents the sensed temperature of the refrigerated compartment;

setting means for setting the temperature of the refrigerated compartment, said setting means producing a set temperature signal which represents the temperature to which the refrigerated compartment is to be set;

processing means coupled to said sensing means, said setting means and said selecting means so as to receive the sensed temperature signal, the set temperature signal and the power select signal, said processing means calculating the difference between the temperature of the refrigerated compartment and the temperature to which the refrigerated compartment is to be set, and producing a difference signal therefrom, said processing means further coupled to the DC electric motor so as to receive a rotational speed signal representing the rotational speed of the DC motor so that the processing means produces the difference signal in consideration of the rotational speed signal;

current control means coupled to said processing means for receiving the power select signal and the difference signal, said current control means further coupled to the field coil of the electric generator so as to control the amount of current supplied to the field coil of the electric generator in response to changes in the difference signal;

duty ratio control means coupled to said processing means for receiving the power select signal and the difference signal therefrom, said duty ratio control means including pulsating means for producing a pulse signal as a duty ratio signal, the value of the duty ratio signal being varied in response to changes in the difference signal when the power select signal is of a value representing that the AC electric power of the commerical power source is being delivered to said output port, the value of the duty ratio signal being maintained at a value representing a 100% duty ratio when the power select signal is of a value representing that the AC electric power of the electric generator is being delivered to said output port; and delivering means coupled to the duty ratio control means for receiving the duty ratio signal, said delivering means intermittently delivering DC electric power to said DC electric motor in response to changes in the value of the duty ratio signal, said delivering means coupled to said current control means, said delivering means producing a voltage signal representing the voltage of the DC electric power produced by said rectifying means, the voltage signal being supplied to said current control means so that the current control means controls the amount of current supplied to the DC electric motor in response to changes in the difference signal and in consideration of the voltage signal.

12. A system for driving a refrigerant compressor according to claim 11 wherein said selecting means comprises a changeover switch.

13. A system for driving a refrigerant compressor according to claim 12 wherein said changeover switch comprises an electromagnetic device.

14. A system for driving a refrigerant compressor according to claim 13 wherein said selecting means senses the state of said electromagnetic device in order to produce the power select signal.

15. A system for driving a refrigerant compressor according to claim 11 wherein said current control means comprises a DC power source.

16. A system for driving a refrigerant compressor according to claim 15 wherein said DC power source comprises a battery.

17. A system for driving a refrigerant compressor according to claim 11 wherein said current control means supplies current to the field coil of the electric generator so as to maximize the efficiency of the generator.

18. A system for driving a refrigerant compressor according to claim 11 wherein said DC electric motor and said compressor are hermetically contained in one casing.

19. A system for driving a refrigerant compressor according to claim 11 wherein said DC electric motor is a brushless motor.

20. A system for driving a refrigerant compressor according to claim 11 wherein said compressor is a scroll type compressor.

21. A system for driving a refrigerant compressor in a refrigerating system for use in a vehicle having an engine, which comprises:

an electric generator mounted on the vehicle and driven by the engine of the vehicle for generating AC electric power, the electric generator including a field coil which receives a direct current;

selecting means having a first input port coupled to the electric generator for receiving AC electric power generated by the electric generator, a second input port which may be coupled to a commercial AC electric power source, and an output port, the selecting means selecting the input to one of the input ports and supplying the selected input to the output port as the selected AC electric power, said selecting means further providing a power select signal indicating whether the selected AC electric power is the AC electric power provided by the electric generator or the AC electric power provided by a commercial AC electric source;

rectifying means coupled to the output port of the selecting means for rectifying the selecting AC electric power to produce DC electric power;

a DC electric motor to be driven by the DC electric power produced by said rectifying means, said DC electric motor being mechanically coupled to the refrigerant compressor;

sensing means for sensing the temperature of a refrigerated compartment mounted on said vehicle, said sensing means producing a sensed temperature signal which represents the sensed temperature of the refrigerated compartment;

setting means for setting the temperature of the refrigerated compartment, said setting means producing a set temperature signal which represents the temperature to which the refrigerated compartment is to be set;

processing means coupled to said sensing means, said setting means and said selecting means so as to receive the sensed temperature signal, the set temperature signal and the power select signal, said processing means calculating the difference between the temperature of the refrigerated compartment and the temperature to which the refrigerated compartment is to be set, and producing a difference signal therefrom, said processing means further coupled to the DC electric motor so as to receive a rotational speed signal representing the rotational speed of the DC motor so that the processing means produces the difference signal in consideration of the rotational speed signal;

duty ratio control means coupled to said processing means for receiving the power select signal and the difference signal therefrom, said duty ratio control means including pulsating means for producing a pulse signal as a duty ratio signal, the value of the duty ratio signal being varied in response to changes in the difference signal when the power select signal is of a value representing that the AC electric power of the commercial power source is being delivered to said output port, the value of the duty ratio signal being maintained at a value representing a 100% duty ratio when the power select signal is of a value representing that the AC electric power of the electric generator is being delivered to said output port; and delivering means coupled to the duty ratio control means for receiving the duty ratio signal, said delivering means intermittently delivering DC electric power to said DC electric motor in response to changes in the value of the duty ratio signal.

22. A system for driving a refrigerant compressor according to claim 21 wherein said selecting means comprises a changeover switch.

23. A system for driving a refrigerant compressor according to claim 22 wherein said changeover switch comprises an electromagnetic device.

24. A system for driving a refrigerant compressor according to claim 23 wherein said selecting means senses the state of said electromagnetic device in order to produce the power select signal.

* * * * *